(12) United States Patent
Baik et al.

(10) Patent No.: US 8,991,559 B2
(45) Date of Patent: Mar. 31, 2015

(54) OIL SUPPLYING ASSEMBLY FOR TRANSMISSION OF VEHICLE

(75) Inventors: Minsung Baik, Whasung-Si (KR); Kyoung Wook Kim, Whasung-Si (KR); Hyunchul Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 392 days.

(21) Appl. No.: 13/556,943

(22) Filed: Jul. 24, 2012

(65) Prior Publication Data

US 2013/0139633 A1 Jun. 6, 2013

(30) Foreign Application Priority Data

Dec. 1, 2011 (KR) .................. 10-2011-0127958

(51) Int. Cl.
*F16H 61/662* (2006.01)
*F16H 57/04* (2010.01)
*F16H 61/00* (2006.01)
*F16H 63/06* (2006.01)

(52) U.S. Cl.
CPC .... F16H 57/0426 (2013.01); *F16H 2061/0046* (2013.01); *F16H 63/065* (2013.01)
USPC ...................... 184/13.1; 74/473.11

(58) Field of Classification Search
CPC ............... F16H 2061/0046; F16H 57/0426; F16H 60/065
USPC ............. 184/13.1, 6.18, 11.1, 11.2, 6.12; 74/473.11; 192/3.3
See application file for complete search history.

(56) References Cited

U.S. PATENT DOCUMENTS

| | | | |
|---|---|---|---|
| 6,428,417 B2 * | 8/2002 | Wakizaka et al. | 464/24 |
| 6,644,440 B2 * | 11/2003 | Kageyama et al. | 184/11.2 |
| 7,866,444 B2 * | 1/2011 | Aldridge | 184/6.18 |
| 8,328,668 B2 * | 12/2012 | Ariga et al. | 474/1 |
| 2001/0004955 A1 * | 6/2001 | Wakizaka et al. | 192/3.29 |
| 2007/0295557 A1 * | 12/2007 | Aldridge | 184/13.1 |
| 2012/0132022 A1 * | 5/2012 | Fronius | 74/331 |

FOREIGN PATENT DOCUMENTS

| | | |
|---|---|---|
| JP | 2001-182802 A | 7/2001 |
| JP | 2010-32033 A | 2/2010 |

* cited by examiner

*Primary Examiner* — William E Dondero
*Assistant Examiner* — Robert T Reese
(74) *Attorney, Agent, or Firm* — Morgan, Lewis & Bockius LLP

(57) ABSTRACT

An oil supplying assembly for a transmission of a vehicle, which may supply oil to a clutch and a pulley of a transmission, may include a base member which is mounted to a transmission main body, and includes a first oil path supplying the oil to the clutch and an oil supply column which is integrally formed to the base member and of which a second oil path for supplying the oil to the pulley is formed thereto.

9 Claims, 4 Drawing Sheets

OIL SUPPLYING ASSEMBLY FOR TRANSMISSION OF VEHICLE

CROSS-REFERENCE TO RELATED APPLICATION

The present application claims priority of Korean Patent Application Number 10-2011-0127958 filed Dec. 1, 2011, the entire contents of which application is incorporated herein for all purposes by this reference.

BACKGROUND OF INVENTION

1. Field of Invention

The present invention relates to a transmission for a vehicle. More particularly, the present invention relates to an oil supplying assembly for a transmission of a vehicle which may supply oil to a clutch and a pulley of a transmission.

2. Description of Related Art

Recently, a transmission for a vehicle may be divided into a manual transmission, a continuously variable transmission (CVT) which supplements drawbacks of the automatic transmission and the manual transmission.

The continuously variable transmission, changeable shift ratio continuously, may realize high performance using optimal performance of an engine, may reduce fuel consumption especially in clogged road such as in downtown, and may reduce shift shock.

The continuously variable transmission usually includes a belt and a pulley as a belt type transmission, and the continuously variable transmission further includes a clutch apparatus receiving power of and engine, a convert apparatus for changing forward and rearward, and a belt pulley apparatus for realizing continuous shift.

And the continuously variable transmission is provided with an oil supply oil path for supplying oil as lubricant to a clutch and a pulley.

In a conventional art, oil paths of the continuously variable transmission includes a first member for supplying to the clutch and a second member for supplying the oil to pulley, and each constitute element is assembled for constituting the oil path.

Since the separated first member and the second member for supplying the oil to the clutch and the pulley of the continuously variable transmission are assembled to manufacturing the oil path in the conventional art, so a number of the elements are overfull, and manufacturing cost is relatively high, and assemble quality is deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an oil supplying assembly for a transmission of a vehicle which may supply oil to a clutch and a pulley of a transmission with reduced elements and thus may reduce manufacturing cost.

An oil supplying assembly for a transmission of a vehicle, which may supply oil to a clutch and a pulley of a transmission, the assembly according to an various aspects of the present invention may include a base member which is mounted to a transmission main body, and includes a first oil path supplying the oil to the clutch and an oil supply column which is integrally formed to the base member and of which a second oil path for supplying the oil to the pulley is formed thereto.

The base member may include a mounting portion which is mounted to the main body and shaped as a disc and a protruding portion which is mounted to a center of the mounting portion convexly and of which an inner space is foamed therein.

The first oil path may include the inner space of the protruding portion.

The first oil path may include a clutch oil supply path which is formed between the mounting portion and the transmission main body.

The first oil path may include a plurality of outlets formed to the protruding portion.

The plurality of outlets may be formed apart from each other at a connecting portion of the oil supply column and the protruding portion.

The oil supply column may be a hollow pipe of which a hollow space is formed therein, and may be integrally formed to the protruding portion.

An end of the oil supply column may be protruding outward from the inner space of the protruding portion.

A pulley oil supply path may be formed to the transmission main body and the hollow space of the oil supply column may be communicated with the pulley oil supply path, wherein the second oil path may include the pulley oil supply path and the hollow space of the oil supply column.

The oil path assembly according to various aspects of the present invention may be applied to a continuously variable transmission. The oil path assembly according to various aspects of the present invention may be applied to an automatic transmission.

According to various aspects of the present invention, the oil supplying assembly for a transmission of a vehicle which may supply oil to a clutch and a pulley of a transmission with reduced elements and thus may reduce manufacturing cost.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
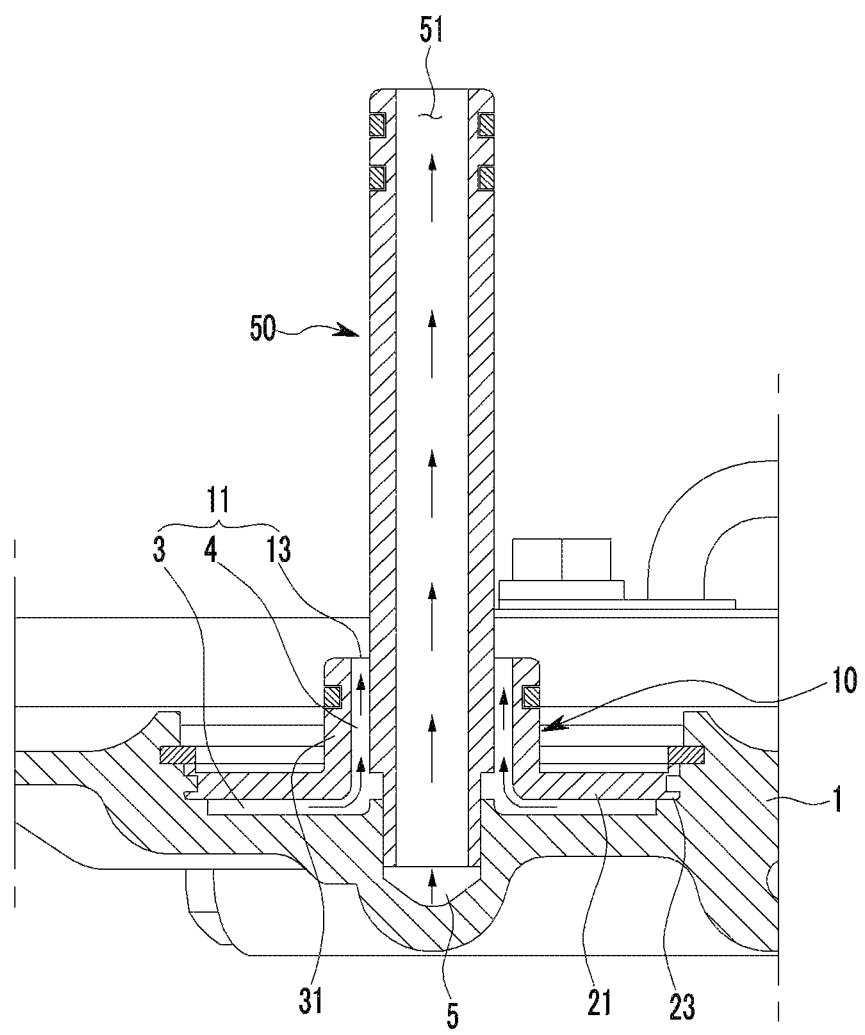
FIG. 1 is a cross-sectional view of an exemplary oil supplying assembly for a transmission of a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

Figure 2:
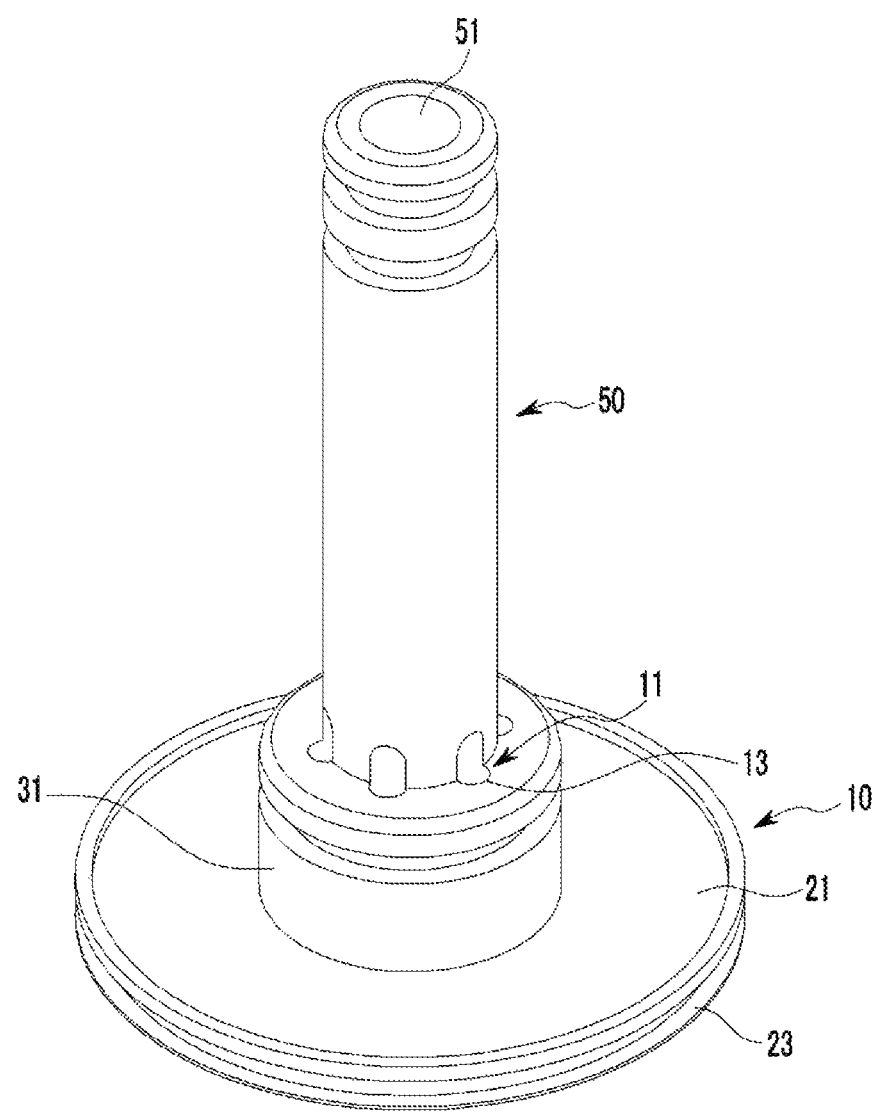
FIG. 2 is a perspective view of an exemplary oil supplying assembly for a transmission of a vehicle according to the present invention.

FIG. 1 is a cross-sectional view of an oil supplying assembly for a transmission of a vehicle according to various embodiments of the present invention, and FIG. 2 is a perspective view of an oil supplying assembly for a transmission of a vehicle according to various embodiments of the present invention.

Referring to FIG. 1 and FIG. 2, an oil supplying assembly for a transmission of a vehicle 100 according to various embodiments of the present invention may be applied to a continuously variable transmission or an automatic transmission.

However, hereinafter, the assembly 100 which is applied to a continuously variable transmission will be described as various embodiments of the present invention for easy comprehension.

For example, the assembly 100 according to various embodiments of the present invention is applied to a belt type continuously variable transmission including a belt and a pulley.

The belt type continuously variable transmission includes a belt and a pulley a clutch apparatus receiving power of and engine, a convert apparatus for changing forward and rearward, and a belt pulley apparatus for realizing continuous shift.

The belt type continuously variable transmission is obvious to a person skilled in the art, and thus detailed description will be omitted in the specification.

In various embodiments of the present invention, the assembly 100 is applied for supplying lubricant oil (hereinafter, it will be called as "oil" for convenience) to a clutch and a pulley of the continuously variable transmission and the assembly 100 may reduce constitutes elements and manufacturing cons and may enhance assemble quality.

The oil supplying assembly for a transmission of a vehicle 100 is mounted to a main body 1 of the continuously variable transmission including a clutch and a pulley and includes a base member 10 and an oil supply column 50.

Figure 3:
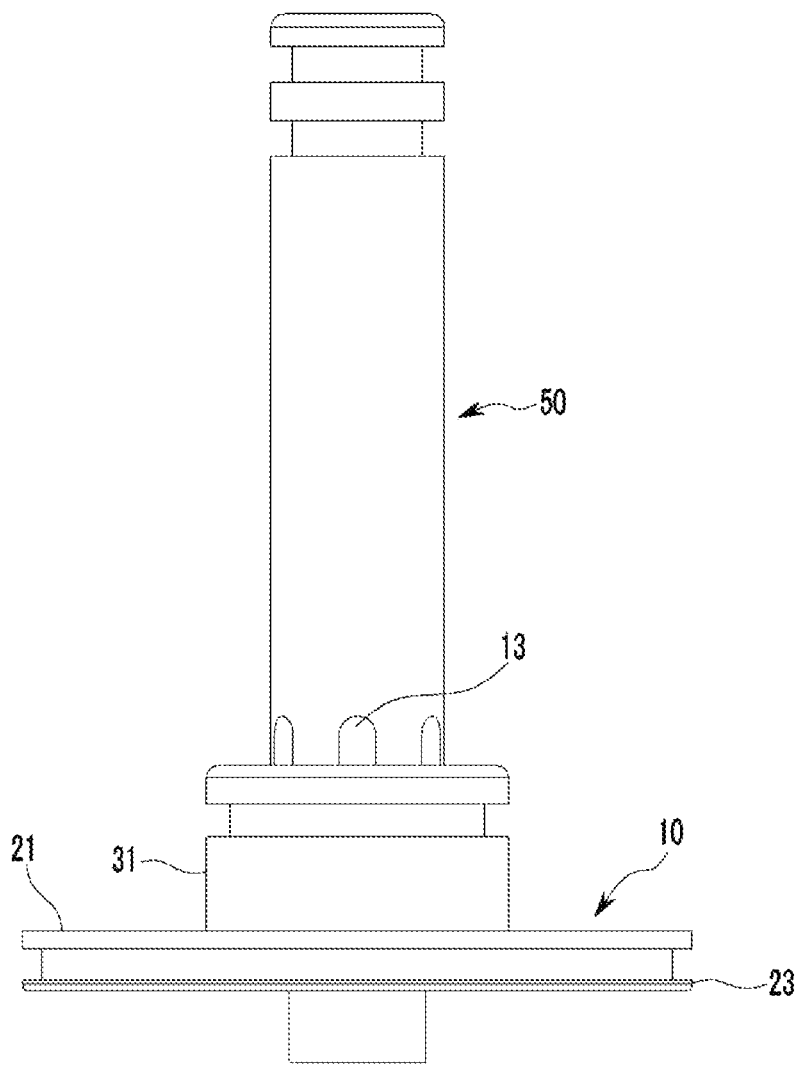
FIG. 3 is a front view of an exemplary oil supplying assembly for a transmission of a vehicle according to the present invention.
Figure 4:
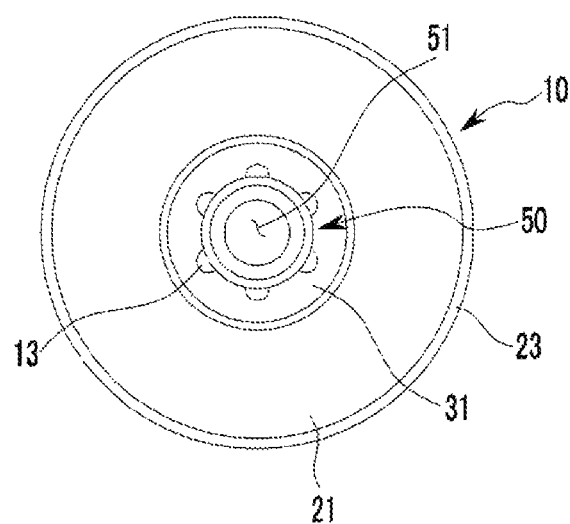
FIG. 4 is a plain view of an exemplary oil supplying assembly for a transmission of a vehicle according to the present invention.

FIG. 3 is a front view of an oil supplying assembly for a transmission of a vehicle according to various embodiments of the present invention, and FIG. 4 is a plain view of an oil supplying assembly for a transmission of a vehicle according to various embodiments of the present invention.

Hereinafter, referring to FIG. 1 to FIG. 4, the base member 10 and the oil supply column 50 of the oil supplying assembly for a transmission of a vehicle 100 according to various embodiments of the present invention will be described in detail.

The base member 10 is mounted to the main body 1 and a the first oil path 11 is provide to the base member 10 for supplying oil to a clutch.

The base member 10 includes a mounting portion 21 mounted to the main body 1 and a protruding portion 31 and integrally and/or monolithically formed to and protruding from the mounting portion 21.

The mounting portion 21 may be shaped as a disc shape or annular and a flange portion 23 is formed to an edge thereof.

The mounting portion 21 forms a clutch oil supply path 3 supplying the oil to the clutch together with the transmission main body 1 and is fixed to the main body 1 through the flange portion 23.

The protruding portion 31 is formed to a center of the mounting portion 21 convexly and an inner space 4 is formed therein. The inner space 4 is communicated with the clutch oil supply path 3.

In various embodiments of the present invention, the oil supply column 50 is integrally and/or monolithically formed to the base member 10 and a hollow space 51 is formed within the oil supply column 50 for supplying the oil to the pulley.

The oil supply column 50 is a hollow pipe of which the hollow space 51 is formed therein, and is integrally and/or monolithically formed within the protruding portion 31 of the base member 10.

The oil supply column 50 passes through the protruding portion 31 of the base member 10 and integrally connected to and/or monolithically formed with the protruding portion 31.

A lower end of the oil supply column 50 passes through and is extended from the inner space 4 of the protruding portion 31.

A pulley oil supply path 5 is formed to the transmission main body 1 for supplying the oil from the main body 1 to the pulley and the hollow space 51 of the oil supply column 50 is connected to the pulley oil supply path 5.

The first oil path 11 includes the inner space 4 of the protruding portion 31 and the clutch oil supply path 3.

Further, the first oil path 11 includes a plurality of outlets 13 formed to the protruding portion 31.

The plurality of outlet 13 is formed to a connecting portion of the oil supply column 50 and the protruding portion 31 apart from each other.

That is, the first oil path 11 may include the outlets 13 formed to the connecting portion of the oil supply column 50, the inner space 4 of the protruding portion 31 and the clutch oil supply path 3.

So, in various embodiments of the present invention, the oil supplying assembly for a transmission of a vehicle 100 may supply the oil from the main body 1 to the clutch oil supply path 3 through the inner space 4 of the protruding portion 31 and the outlet 13.

And, in various embodiments of the present invention, the oil supplied from the pulley oil supply path 5 to the pulley is supplied through the hollow space 51 of the oil supply column 50. In this case, the pulley oil supply path 5 and the hollow space 51 of the oil supply column 50 form the second oil path.

As described above, the oil supplying assembly for a transmission of a vehicle 100 according to various embodiments of the present invention supplying the oil to the clutch and the pulley may be constituted by integrally and/or monolithically forming the base member 10 of which the first oil paths 11 is formed thereto and the oil supply column 50 of which the second oil path is there to.

And thus, the assembly 100 according to various embodiments of the present invention may reduce constitutes elements and manufacturing cons and may enhance assemble quality.

For convenience in explanation and accurate definition in the appended claims, the terms lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil supplying assembly for a transmission of a vehicle for supplying oil to a clutch and a pulley of the transmission, the assembly comprising:
   a base member mounted to a transmission main body, and includes a first oil path supplying the oil to the clutch; and
   an oil supply column integrally formed to the base member and of which a second oil path for supplying the oil to the pulley is formed thereto,
   wherein the base member comprises:
      a mounting portion mounted to the main body and shaped as a disc; and
      a protruding portion mounted to a center of the mounting portion convexly and of which an inner space is formed therein, and
   wherein the oil supply column is a hollow pipe of which a hollow space is formed therein, and is integrally formed to the protruding portion.

2. The oil supplying assembly of claim 1, wherein the first oil path comprises the inner space of the protruding portion.

3. The oil supplying assembly of claim 2, wherein the first oil path comprises a clutch oil supply path formed between the mounting portion and the transmission main body.

4. The oil supplying assembly of claim 1, wherein the first oil path comprises a plurality of outlets formed to the protruding portion.

5. The oil supplying assembly of claim 4, wherein the plurality of outlets are formed apart from each other at a connecting portion of the oil supply column and the protruding portion.

6. The oil supplying assembly of claim 1, wherein an end of the oil supply column is protruding outward from the inner space of the protruding portion.

7. The oil supplying assembly of claim 6, wherein:
   a pulley oil supply path is formed to the transmission main body; and
   the hollow space of the oil supply column is communicated with the pulley oil supply path,
   wherein the second oil path comprises the pulley oil supply path and the hollow space of the oil supply column.

8. The oil supplying assembly of claim 1, wherein the assembly is applied to a continuously variable transmission.

9. The oil supplying assembly of claim 1, wherein the assembly is applied to an automatic transmission.

* * * * *